(12) United States Patent
Chevance et al.

(10) Patent No.: US 7,983,939 B2
(45) Date of Patent: Jul. 19, 2011

(54) METHOD FOR AUTOMATICALLY MAPPING CABIN AND TRAVEL CLASS STRUCTURES OF AIRLINE DISRUPTED FLIGHTS INTO REPLACEMENT FLIGHTS

(75) Inventors: Jean-Philippe Chevance, Mougins (FR); Luc Choubert, Juan les Pins (FR); David Pasero, Mougins (FR); Erwan Peran, Biot (FR)

(73) Assignee: Amadeus s.a.s., Biot (FR)

( * ) Notice: Subject to any disclaimer, the term of this patent is extended or adjusted under 35 U.S.C. 154(b) by 270 days.

(21) Appl. No.: 12/334,104

(22) Filed: Dec. 12, 2008

(65) Prior Publication Data

US 2010/0140399 A1 Jun. 10, 2010

(30) Foreign Application Priority Data

Dec. 4, 2008 (EP) .................................. 08305884

(51) Int. Cl.
*G06Q 10/00* (2006.01)
(52) U.S. Cl. ................................. 705/5; 705/6
(58) Field of Classification Search .............. 705/5–6
See application file for complete search history.

(56) References Cited

U.S. PATENT DOCUMENTS

| | | | | |
|---|---|---|---|---|
| 2003/0191678 A1* | 10/2003 | Shetty et al. | .................. | 705/8 |
| 2003/0225600 A1* | 12/2003 | Slivka et al. | .................. | 705/5 |
| 2005/0071206 A1* | 3/2005 | Berge | .................. | 705/6 |
| 2005/0125265 A1* | 6/2005 | Bramnick et al. | .................. | 705/5 |
| 2005/0165628 A1* | 7/2005 | Vaaben et al. | .................. | 705/5 |
| 2006/0241983 A1 | 10/2006 | Viale | | |
| 2008/0270222 A1* | 10/2008 | Goel | .................. | 705/10 |
| 2008/0294469 A1* | 11/2008 | Caballero et al. | .................. | 705/5 |
| 2009/0182590 A1* | 7/2009 | Ashby et al. | .................. | 705/5 |

FOREIGN PATENT DOCUMENTS

| | | |
|---|---|---|
| WO | 03036417 | 5/2003 |
| WO | WO 03036417 A2 * | 5/2003 |
| WO | 2005071581 | 8/2005 |

\* cited by examiner

*Primary Examiner* — Fadey S Jabr
(74) *Attorney, Agent, or Firm* — Young & Thompson

(57) ABSTRACT

In a method for automatically mapping a cabin and travel class structure of an disrupted flight into replacement flights, cabin and travel class structure of the disrupted flight are retrieved. For each affected passenger, a base disrupted flight is determined from the passenger itinerary. For the disruption period, cabin and travel class structure of the replacement flights are split into sub-periods. For each sub-period, mapping begins by establishing a direct match between cabin and travel class structures. The direct match is validated against actual cabin and travel class structure of the replacement flights, including pinpointing all found discrepancies. All class matching tables (CMTs) applying to the disrupted flight and disruption period considered are retrieved from a rule repository. Cabin and travel class structure of the replacement flights are further split in sub-periods to imbed the actual validity periods of retrieved CMTs. Rules of the retrieved CMTs resolve all found discrepancies.

15 Claims, 2 Drawing Sheets

METHOD FOR AUTOMATICALLY MAPPING CABIN AND TRAVEL CLASS STRUCTURES OF AIRLINE DISRUPTED FLIGHTS INTO REPLACEMENT FLIGHTS

FIELD OF THE INVENTION

The present invention relates generally to the re-accommodation of passengers following a disruption in travel services and more particularly to a method for automatically mapping the cabin and travel class structures of disrupted airline flights into the ones of replacement flights.

BACKGROUND OF THE INVENTION

The transportation of persons is a challenging task in all of its aspects. The airline industry has developed a particularly sophisticated computerized environment to help all the actors of this travel oriented industry managing the flows of passengers carried on various types of aircrafts and operated by numerous independent airline companies all over the world.

Central to this worldwide industry are a few global distribution systems (GDSs) that provide travel services to affiliated airlines and to all sorts of travel service providers in general, including the traditional and online travel agencies. Such a GDS is for example AMADEUS, a European travel service provider with headquarters in Madrid, Spain. The scope of GDS offered services is very wide. For airlines it includes all the aspects of schedule planning, reservation and booking of passengers on their aircrafts.

In spite of this sophistication, the reality of transportation services delivered by airline companies is that operational flight delays or cancellations are however frequent. A single flight or a network of flights may be impacted depending on the type of disruption encountered. For example, a mechanical difficulty may disrupt a single flight, while bad weather conditions may disrupt many flights. Also, air companies have sometimes to rearrange their network of flights, e.g., to reduce operational costs and to better adapt to the demand.

Whichever the cause of the disruption, the impacted passengers have generally to be re-accommodated quickly. Impacted passengers are all those that are booked on a disrupted plane, are already waiting or are on their way to an airport, or are on board of a plane to catch a disrupted connection flight. Re-accommodation is always a disturbing event for the passengers whose satisfaction is a prime concern for the airlines on which they fly.

Flight disruptions have thus a very high cost for the airlines which have to handle, often in a very short time, numerous disrupted passengers, sometimes thousands, when many flights are suddenly cancelled. Skilled personnel must become, unexpectedly, available to re-assign the disrupted passengers on other flights with a minimum impact in term of delays while attempting to offer them the same level of services as in the booked disrupted flights.

There is therefore a need for a new automated service to be provided by GDSs to airlines allowing them to handle in real-time the mapping of cabin and travel classes of disrupted passengers into the ones of the replacement flights.

This object of the invention must be achieved with the prime objectives of keeping clients of the airlines satisfied by offering them the same level of services in the replacement flights while minimizing the cost of the disruption for the airlines.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention fulfills the above objects of the invention by providing a method for automatically mapping a cabin and travel class structure of an airline disrupted flight into the ones of replacement flights. The cabin and travel class structure of the airline disrupted flight are first retrieved. For each passenger impacted by the disruption, a base disrupted flight is determined out of the passenger itinerary. For the whole disruption period the cabin and travel class structure of the replacement flights are split in sub-periods. For each disruption sub-period, the mapping is initialized by first establishing a direct match between the cabin and travel class structures. Then, the direct match is validated against the actual cabin and travel class structure of the replacement flights which includes pinpointing all found discrepancies. All class matching tables (CMTs) that apply to the disrupted flight for the disruption period considered are retrieved from a repository of rules. The cabin and travel class structure of the replacement flights are further split in sub-periods to imbed the actual validity periods of the retrieved CMTs. Finally, rules of the retrieved CMTs are applied to resolve all found discrepancies.

The invention may also include the following optional features:

Retrieving all CMTs includes retrieving a default CMT.

The default CMT applies to resolve discrepancies if no other CMTs are retrieved or if no other retrieved CMTs apply for the disruption sub-period considered.

Determining a base disrupted flight consists in selecting the longest flight of the passenger itinerary.

Splitting in sub-periods includes dividing the whole disruption period in as many sub-periods as there are different defined cabin and travel class validity periods in the one or more replacement flights.

The method of the invention further including: retrieving from the repository of rules a re-accommodation automation rule to check the overall automatic mapping between the cabin and travel class structures of the airline disrupted flight and of the one or more replacement flights; and, if checking fails, requiring a manual audit to correct the actions of the automatic mapping.

The above retrieving step includes checking that no disrupted passengers are adversely impacted by the automatic mapping.

The validation of the direct match ends the automatic mapping of the cabin and travel class structures if no discrepancy is found.

The invention also describes an automatic passenger re-accommodation system including a class mapping module comprising means adapted for carrying out the method for automatically mapping a cabin and travel class structure of an airline disrupted flight into the ones of replacement flights.

The invention further describes a computer program product stored on a computer readable storage medium, comprising computer readable code means for causing at least one computer to operate the method of automatically mapping a cabin and travel class structure of an airline disrupted flight into the ones of replacement flights.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

On each flight operated by airline companies a cabin class structure is defined which associates a list of travel classes with the cabins, i.e. with the physical sections in which the aircraft used to operate the flight is divided. The cabin class structure can be arranged differently over different time periods. An example is given hereafter for a given period of time (Jan. 10 to Feb. 25, 2007) where flight XX1 has a cabin F and a cabin J to which travel class F and travel classes J, C and D are respectively associated with. Similarly, flight XX2 has a single cabin J to which the travel classes J and I are associated with.

| Flight number | Segment | Start Date-End Date - Frequency | Cabin/Class structure | |
|---|---|---|---|---|
| XX1 | NCE-LHR | 10Jan07-25Feb07 | F/F | J/JCD |
| XX2 | NCE-LHR | 10Jan07-25Feb07 | J/JI | |

It is worth noticing here that the letter codes that define cabins and travel classes are not standardized among airline companies. If F and Y are often used to designate, respectively, first and economy cabins and full-fare travel classes, many other letter codes are in use with different meanings by different airline companies. Hence, the exemplary letter codes used in the description are just factitious codes used to illustrate the invention and should not be further interpreted.

In view of re-accommodating disrupted passengers a class mapping needs to be set between pairs of flights so that a correspondence can be established between the classes of two different flights, for example, to map the classes from flight XX1 to the ones of flight XX2, as follows:

| Flight number | Segment | Class mapping | | | |
|---|---|---|---|---|---|
| FROM XX1 | NCE-LHR | F | J | C | D |
| TO XX2 | NCE-LHR | J | J | I | J |

To drive the matching process a class matching table (CMT) of rules is first set by an administrator of the system. As further explained in the following description of the invention CMT allows building automatically the class mapping between two flights. For each cabin and each class of the "from flight" an administrator of the system needs to decide to which cabin and class passengers are rebooked in the "to flight". A one to one correspondence between cabins and classes can be explicitly set between the two flights. However, rules can also be expressed under the form of self-explanatory keywords such as: MATCHING, HIGHEST, NEXT_LOWER, LOWEST, etc.

An example of such a CMT is as follows:

| FROM flight | | TO flight | |
|---|---|---|---|
| Cabin | Class | Cabin | Class |
| F | A | J | J |
| Y | Y | MATCHING | HIGHEST |
| F | F | NEXT_LOWER | LOWEST |
| J | D | HIGHEST | HIGHEST |
| M | M | LOWEST | T |

Figure 1:
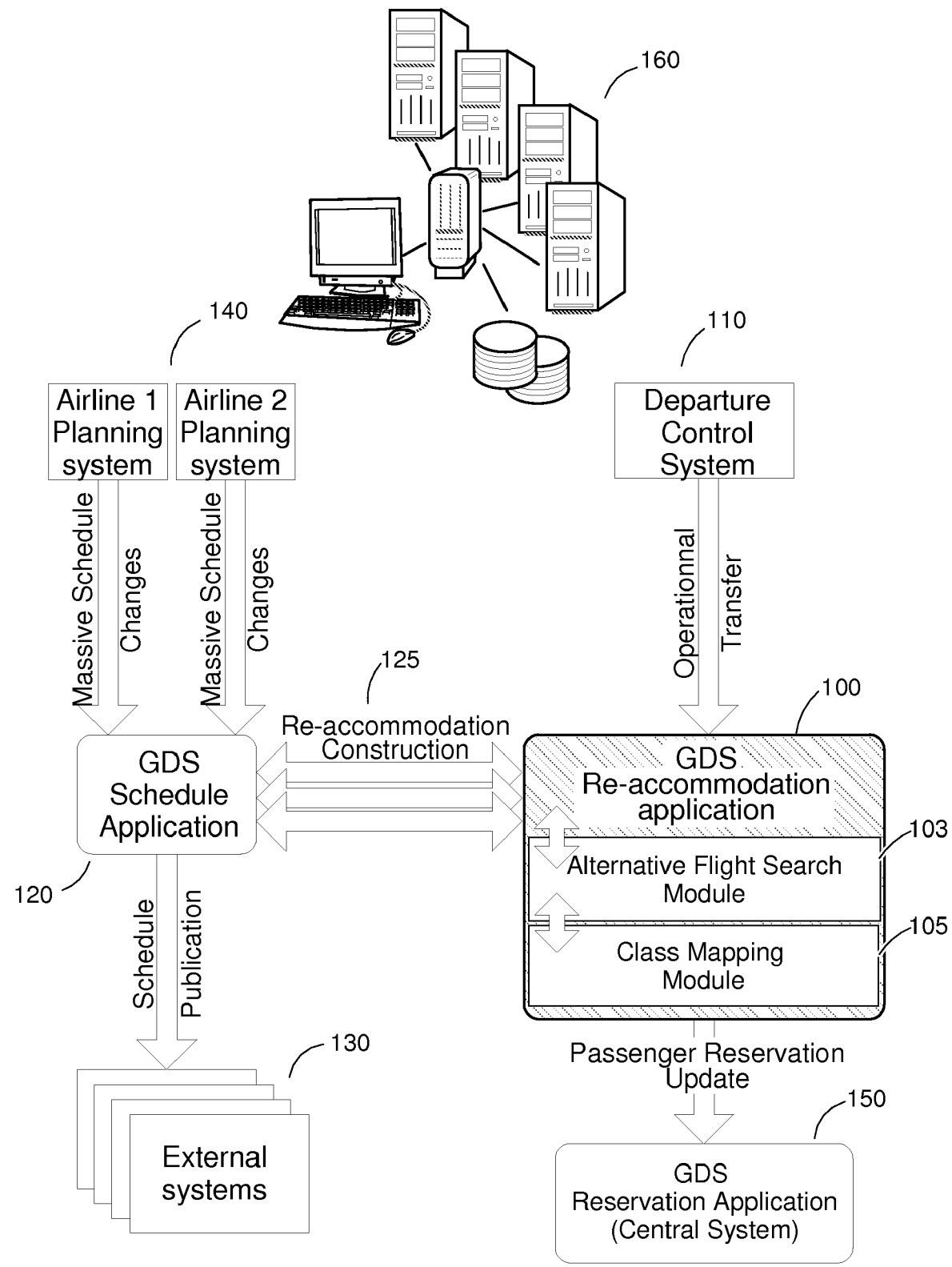
FIG. 1 shows the overall architecture of a system according to the invention.

FIG. 1 shows the overall architecture of a system according to the invention.

Re-accommodation of disrupted passengers by the re-accommodation application (100) requires having to perform in real time the above mapping of the cabin class structures between the disrupted "from flights" to the replacement "to flights". In particular situations the workload of the application may become extremely high, e.g.:

when one or more airlines (140) do massive schedule changes, e.g., to do a re-optimization of their network of flights, a large traffic is generated. In this situation several thousands of passengers may have to be rebooked on different flights in a very short time frame. The schedule application (120) of the GDS to which airlines are affiliated needs then to issue numerous requests (125) to the re-accommodation application (100) to have passengers automatically rebooked on new flights and have external airlines systems (130) updated accordingly.

if an operational disruption occurs close to a flight departure (e.g., a flight is cancelled a few hours before departure) the transfer of disrupted passengers is initiated in this case by the departure control system (DCS) of the airport (110) so that passengers can be rebooked on other flights. DCS invokes the GDS re-accommodation application (100) to make, in real-time, automated decisions on the passenger transfers.

In any case, passenger re-accommodations first require finding alternative non-fully booked flights. This possibly includes finding alternate routes to passenger destinations. This is performed by the alternative flight search module (103) of the re-accommodation application prior to invoking the class mapping module (105) of the invention.

A system according of the invention is generally implemented as part of large computerized resources such as the ones put in place by GDSs (160). They typically include a plurality of computers with sufficient internal and external storing facilities and enough processing power to operate all sorts of travel services implemented under the form of dedicated software applications and provided on a worldwide basis by GDSs to travel industry participants including: airlines, traditional and online travel agencies, travel service providers and airports Following describes, first through a detailed example, the algorithm used by the class mapping module to map classes between the disrupted flights and the replacement ones.

The process is thus performed between two sets of flights: the list of flights to replace, i.e., the "from flights"; and the list of replacement flights, i.e., the "to flights". For example, from May 1 to May 30, 2003, for each day of the week, the following "from flights" are cancelled and replaced as summarized in following table:

| 01May03-30May03-1234567 | | | | | |
|---|---|---|---|---|---|
| From 0 | CDG-LHR | BA303/0 | 17:30 | 19:00 | * Cancel |
| From 1 | LHR-BKK | BA009/0 | 21:45 | 06:35 + 2 | * Cancel |
| To 0 | CDG-LHR | BA305/0 | 20:45 | 22:15 | * |
| To 1 | LHR-BKK | BA015/0 | 23:50 | 10:05 + 2 | * |

Among all the flights cancelled, a "from flight" is selected as the reference or base flight for the algorithm. It is the flight which has triggered the disruption or the longest replacement flight of an itinerary since, in an attempt to better accommodate the disrupted passenger, it makes more sense to focus on the flight a passenger is going to spend more time. In the chosen example the base flight is the international flight, i.e., the longest flight:

| From 1 | LHR-BKK | BA009/0 | 21:45 | 06:35 + 2 | * Cancel |
|---|---|---|---|---|---|

As already mentioned the cabin/class structures of flights may change over time so that they have different validity periods. For the above chosen base flight the system first identifies its cabin/class structure for the disruption period considered, i.e.: May 1 to May 30, 2003:

| From 1 | LHR-BKK | BA009/0 | 21:45 | 06:35 + 2 | Cancel |
|---|---|---|---|---|---|
| | F/FAB | C/CD | | | |

Cabin/class structure of base flight which must then be mapped into the "to flights" however having their own cabin/class structures and validity periods, as follows:

| To 0 | CDG-LHR | BA305/0 | 20:45 | 22:15 |
|---|---|---|---|---|
| | 01May03-15May03-1234567 | | | |
| | F/FAB | C/CD | | |
| | 16May03-30May03-1234567 | | | |
| | F/FA | C/CB | | |
| To 1 | LHR-BKK | BA015/0 | 23:50 | 10:05 + 2 |
| | 01May03-10May03-1234567 | | | |
| | F/FAB | C/CD | | |
| | 11May03-30May03-1234567 | | | |
| | F/FA | C/CD | | |

The mapping periods to be considered are computed by a "period division" algorithm which splits the disruption period in as many sub-periods as required by the validity periods of the "to flights". For the example chosen to illustrate the invention the split periods are then:

| From 1 | May 1rst, 03 | | | | May 30, 03 |
|---|---|---|---|---|---|
| To 0 | | | May 15 | | |
| To 1 | | May 11 | | | |
| Split | 1 | 10 11 | 15 | 16 | 30 |

Once the periods on which class mapping can be different have been identified the algorithm first simply assumes that a direct mapping of the cabin/class structure, over all split periods, for each combination item of the "from flight" cabin/class structure is possible. The following intermediate table is thus built:

| from 1 | | to 0 | to 1 |
|---|---|---|---|
| 01May03-10May03-1234567 | | | |
| F/F | ⇨ | F/F | F/F |
| F/A | ⇨ | F/A | F/A |
| F/B | ⇨ | F/B | F/B |
| C/C | ⇨ | C/C | C/C |
| C/D | ⇨ | C/D | C/D |
| 11May03-15May03-1234567 | | | |
| F/F | ⇨ | F/F | F/F |
| F/A | ⇨ | F/A | F/A |
| F/B | ⇨ | F/B | F/B |
| C/C | ⇨ | C/C | C/C |
| C/D | ⇨ | C/D | C/D |
| 16May03-30May03-1234567 | | | |
| F/F | ⇨ | F/F | F/F |
| F/A | ⇨ | F/A | F/A |
| F/B | ⇨ | F/B | F/B |
| C/C | ⇨ | C/C | C/C |
| C/D | ⇨ | C/D | C/D |

This direct mapping of the sub-periods must be further validated against the actual cabin/class structures of the "to flights". In the general case this cannot be achieved completely. In the chosen example the following discrepancies are found because the corresponding services (cabin and/or travel classes) do not exist in the selected "to flights":

| from 1 | | to 0 | to 1 |
|---|---|---|---|
| 01May03-10May03-1234567 | | | |
| F/F | ⇨ | F/F | F/F |
| F/A | ⇨ | F/A | F/A |
| F/B | ⇨ | F/B | F/B |
| C/C | ⇨ | C/C | C/C |
| C/D | ⇨ | C/D | C/D |
| 11May03-15May03-1234567 | | | |
| F/F | ⇨ | F/F | F/F |
| F/A | ⇨ | F/A | F/A |
| F/B | ⇨ | F/B | ~~F/B~~ |
| C/C | ⇨ | C/C | C/C |
| C/D | ⇨ | C/D | C/D |
| 16May03-30May03-1234567 | | | |
| F/F | ⇨ | F/F | F/F |
| F/A | ⇨ | F/A | F/A |
| F/B | ⇨ | | ~~F/B~~ |
| C/C | ⇨ | C/C | C/C |
| C/D | ⇨ | ~~C/D~~ | C/D |

At this step, because there exist differences in cabin and class structures between the "from flight" and the "to flight", the algorithm must retrieve mapping rules that may apply to decide how mapping of the found discrepancies must be conducted. CMTs of the kind previously discussed may have been created by an administrator or authorized operator of a rules repository to define non-standard behaviour. However, in the general case, they will incompletely cover, or will not match exactly, the split disruption period as computed here above. Also, no CMT table may have been created for the flights and for the time frame considered in which case default rules must be used (i.e., a default CMT is assumed to exist). The example chosen to illustrate the invention further assumes that following two specific CMTs are indeed retrieved covering partly the disruption time frame:

| CMT#1: BA009 -> BA305 |
|---|
| 16May03-30May03-1234567 |
| Set of Rules of CMT #1: |
| ..... |

| CMT#2: BA009 -> BA015 |
|---|
| 16May03-25May03-1234567 |
| Set of Rules of CMT #2: |
| .... |
| 26May03-30May03-1234567 |
| No Data found -> Default CMT assumed |

Since several rules have been found covering time frames that do not match exactly the split disruption period previously computed it must be further split, using the same previous "period division" algorithm, as follows:

| From 1 | May 1rst, 03 | | | | | May 30, 03 |
|---|---|---|---|---|---|---|
| To 0 | | | May 15 | | | |
| To 1 | | May 11 | | May 25 | | |
| Split | 1 | 10 11 | 15 16 | | 25 26 | 30 |

Then, the direct mapping table of cabin/class structures previously shown, including the discrepancies, when taking into account the updated split disruption periods, becomes:

| from 1 | | to 0 | to 1 |
|---|---|---|---|
| 01May03-10May03-1234567 | | | |
| F/F | ⇨ | F/F | F/F |
| F/A | ⇨ | F/A | F/A |
| F/B | ⇨ | F/B | F/B |
| C/C | ⇨ | C/C | C/C |
| C/D | ⇨ | C/D | C/D |
| 11May03-15May03-1234567 | | | |
| F/F | ⇨ | F/F | F/F |
| F/A | ⇨ | F/A | F/A |
| F/B | ⇨ | F/B | ~~F/B~~ |
| C/C | ⇨ | C/C | C/C |
| C/D | ⇨ | C/D | C/D |
| 16May03-25May03-1234567 | | | |
| F/F | ⇨ | F/F | F/F |
| F/A | ⇨ | F/A | F/A |
| F/B | ⇨ | ~~F/B~~ | ~~F/B~~ |
| C/C | ⇨ | C/C | C/C |
| C/D | ⇨ | ~~C/D~~ | C/D |
| 26May03-30May03-1234567 | | | |
| F/F | ⇨ | F/F | F/F |
| F/A | ⇨ | F/A | F/A |
| F/B | ⇨ | ~~F/B~~ | ~~F/B~~ |
| C/C | ⇨ | C/C | C/C |
| C/D | ⇨ | ~~C/D~~ | C/D |

On which the rules found in CMT#1 and CMT#2 are applied, along with the default rules if a specific CMT is not found to complete the mapping. For the example chosen to illustrate the invention the rules applied are:

CMT#1: put any unmatched class of a given cabin in the highest class of next lower cabin.

CMT#2: put any unmatched class of a given cabin in the lowest class of matching cabin.

Default CMT: put any unmatched class of a given cabin in the highest class of matching cabin.

This gives following mapping:

| from 1 | | to 0 | to 1 | Rules applied |
|---|---|---|---|---|
| 01May-03-10May03-1234567 | | | | |
| F/F | ⇨ | F/F | F/F | |
| F/A | ⇨ | F/A | F/A | |
| F/B | ⇨ | F/B | F/B | |
| C/C | ⇨ | C/C | C/C | |
| C/D | ⇨ | C/D | C/D | |
| 11May-03-15May03-1234567 | | | | |
| F/F | ⇨ | F/F | F/F | |
| F/A | ⇨ | F/A | F/A | |
| F/B | ⇨ | F/B | F/F | Default CMT |
| C/C | ⇨ | C/C | C/C | |
| C/D | ⇨ | C/D | C/D | |
| 16May-03-25May03-1234567 | | | | |
| F/F | ⇨ | F/F | F/F | |
| F/A | ⇨ | F/A | F/A | |
| F/B | ⇨ | F/F | F/F | CMT #1, CMT #2 |
| C/C | ⇨ | C/C | C/C | |
| C/D | ⇨ | C/C | C/D | CMT #1 |
| 26May-03-30May03-1234567 | | | | |
| F/F | ⇨ | F/F | F/F | |
| F/A | ⇨ | F/A | F/A | |
| F/B | ⇨ | F/F | F/F | CMT #1, Default CMT |
| C/C | ⇨ | C/C | C/C | |
| C/D | ⇨ | C/C | C/D | CMT #1 |

Finally, in order to check what has been automatically built by the system, the last step of the algorithm consists in validating the overall result of the automated cabin/class mapping. To this end, a dedicated rule (re-accommodation automation rule) is invoked to check if some passengers are not adversely impacted by a change of cabin, or by a change of class. If checking fails, the automated process can be interrupted to allow a further manual audit and corrections applied before the re-accommodation in the "to flights" is actually released.

Figure 2:
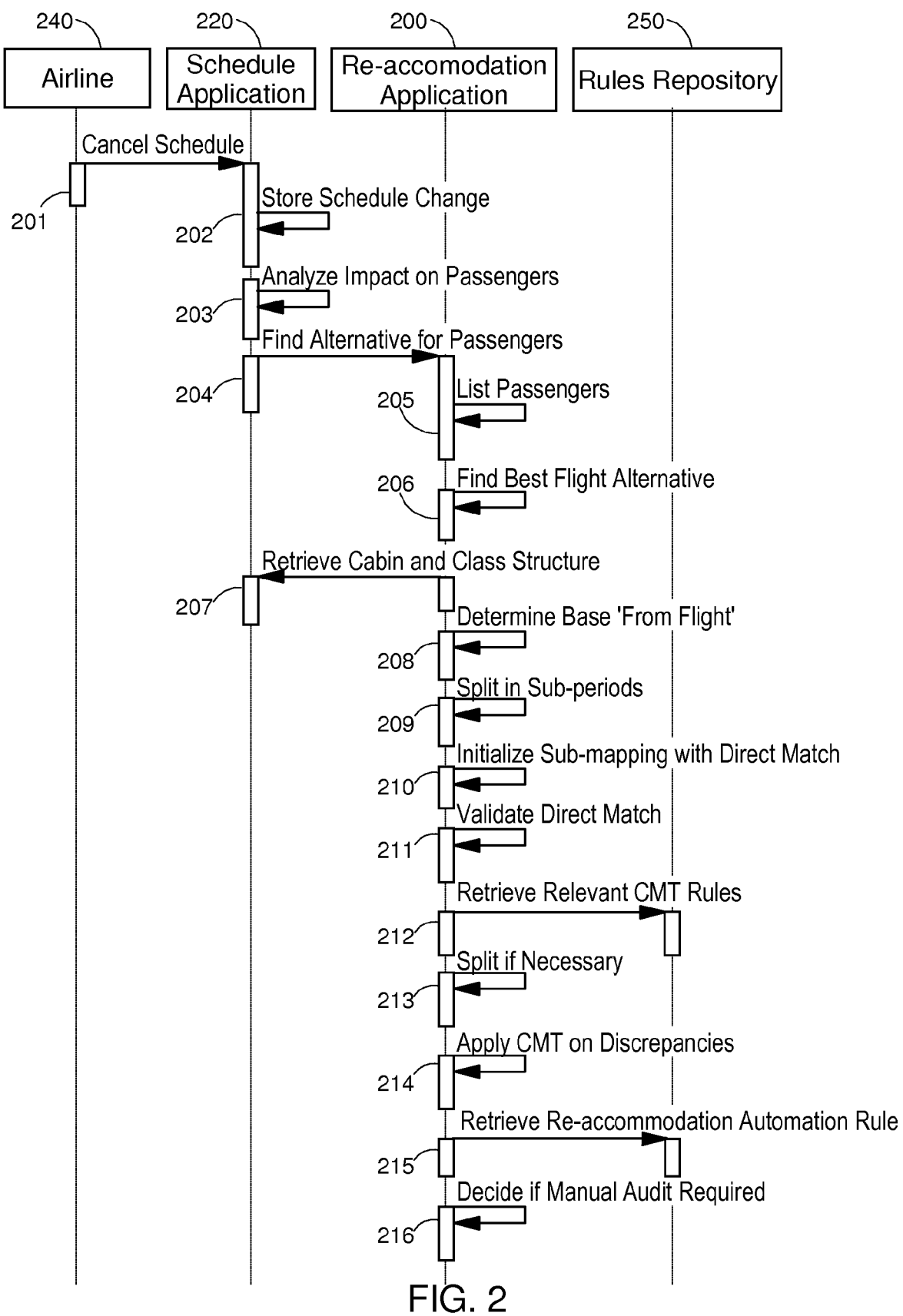
FIG. 2 shows the steps of the method for automatically mapping cabin and travel class structures of airline disrupted flights into replacement flights.

FIG. 2 shows the steps of the method for automatically mapping cabin and travel class structures of airline disrupted flights into replacement flights.

The method starts when a scheduled flight is cancelled (201) by an airline (240). The schedule application (220), discussed in FIG. 1 (120), is invoked to store schedule changes (202) and to analyze the impact on the passengers (203). This triggers in turn the calling (204) of the re-accommodation application (200), also shown in the architecture view of FIG. 1 (100), first to find the list of impacted passengers (205) for whom an alternative flight must be found (206). Once done, the re-accommodation application must also retrieve (207) the cabin and class structure of the cancelled flight from the schedule application.

As previously discussed the next step (208) consists in determining what flight of an itinerary is going to serve as a base flight to perform the automatic cabin and travel class mapping between the disrupted flight and the replacement one. The one which is more meaningful for the passenger, i.e., the longest one, is generally selected. In the foregoing example used to illustrate the invention this is the 'from 1' flight which is thus selected.

The following step (209) splits in as many sub-periods as necessary the validity periods of the cabin/class structure of the replacement flights selected at step (206) for the duration of the disruption period considered which lasts from May 1 to May 30 in the chosen example.

Then, a direct mapping of the cabin/class structure between the base 'from flight' and the 'to flight' is initialized at step (210) for each sub-period resulting of the previous split of the disruption period. A validation step follows (211) which pin-point the discrepancies. To resolve discrepancies the repository of rules (250) is interrogated (212) to retrieve any relevant CMT rules that may apply. In the general case, retrieve rules partially apply, e.g., for time periods that cover partially the disruption period, and a new split is necessary (213) which increases the number of sub-periods to consider. Finally, the CMT rules are applied to resolve, for each sub-period, the discrepancies including the application of a default CMT rule if no specific rule could be found at step (212). All these steps are shown in the foregoing example used to illustrate the invention.

A final checking is performed on the basis of a 're-accommodation automation rule' retrieved from the repository of rules (215) to verify that no passenger is adversely impacted by the automatic remapping. If this were the case a manual intervention would be required (216).

The class mapping module (105) of the invention is thus part of the re-accommodation system shown in FIG. 1 (100) and includes following features:

It finds a replacement solution and tries to limit the schedule change impacts for the passengers.

It implements a fully automated process to re-accommodate passengers impacted by schedule changes.

It automatically analyzes the original list of classes and cabins and their counterparts in the flight(s) replacing the disrupted one. The result of the analysis is a mapping between the two cabin/class structures.

It manages as well schedule changes over a time period even though this is achieved at the expense of an additional complexity in the class mapping process since several different class configurations may have to be applied over the disruption period.

It is able to manage the sharing of flight codes between airline partners. When a booking on a code-sharing flight is done two classes are involved: the marketing class of service and the corresponding one of the operated flight (on behalf of the partner). When the disruption occurs, a replacement has to be found for both.

It can be driven by rules called class matching rules which allow, e.g., the application of a specific mapping behavior between two sets of flights.

It detects potential irrelevant class mapping in order to require a manual intervention.

It can handle simultaneously many class mapping requests.

Hence, the overall objective of the invention is to provide for each existing cabin and class on the disrupted flights the best possible cabin and class on the replacement flights. This is achieved through an automated re-accommodation process that requires no or few manual interventions from skilled personnel to minimize the cost for the airlines and to allow them handling a large number of disrupted passengers in rush times.

Flexibility of the mapping is achieved through the use of dedicated mapping rules that can be tailored to a specific market (e.g., the European market) or just to a particular flight. The impact of the disruption is minimal for the passengers that are quickly rebooked in other flights with the same level of services.

What is claimed is:

1. A method for automatically mapping a cabin and travel class structure of an airline disrupted flight into the cabin and travel class structures of at least one replacement flight, the method comprising:
    performing the steps of the method via at least one programmed computer processor, comprising:
    determining a disruption period;
    retrieving the cabin and travel class structure of the airline disrupted flight for the disruption period;
    retrieving cabin and travel class structure data of at least one replacement flight, said data comprising, for the disruption period, different cabin and travel class structures each applicable during a disruption sub-period within the disruption period;
    for each disruption sub-period,
    initializing the mapping by first establishing a direct match between the cabin and travel class structure of the disrupted flight and the cabin and class structures of the at least one replacement flight;
    validating the direct match against the cabin and travel class structures of the at least one replacement flights, the validating step including the further step of detecting discrepancies;
    retrieving from a repository of rules class matching tables (CMTs) that apply to the disrupted flight for the disruption period and specifying correspondences between the cabin and travel class structure of the airline disrupted flight and the cabin and the travel class structures of the at least one replacement flight;
    retrieving validity periods for the class matching tables in which several validity periods partly covers the disruption sub-period;
    splitting the disruption sub-period is further sub-periods each corresponding to one single validity period of the class matching tables;
    for each discrepancy:
        retrieving rules of the class matching table corresponding to the further sub-period;
        applying the retrieved rules and determining a rule-driven mapping cabin and travel class pair assigned to the at least one replacement flight for the further sub-period in lieu of the discrepancy;
        creating a mapping between the cabin and travel class structure of the airline disrupted flight and the cabin and class structure of the at least one replacement flight using the direct match each time no discrepancy is detected and the rule-driven mapping cabin and travel class structure each time a discrepancy is detected.

2. The method of claim 1, wherein the step of retrieving all CMTs includes retrieving a default CMT.

3. The method of claim 2 wherein the default CMT applies to resolve discrepancies upon no other CMTs being retrieved or upon no other retrieved CMTs applying for the disruption sub-period considered.

4. The method of claim 3, further comprising:
    retrieving from the repository of rules a re-accommodation automation rule to check the overall automatic mapping between the cabin and travel class structures of the airline disrupted flight and of the one or more replacement flights;

upon checking failing,
  requiring a manual audit to correct the actions of the automatic mapping.

5. The method of claim 1 wherein the step of determining a base disrupted flight consists in selecting the longest flight of a passenger itinerary.

6. The method of claim 5, further comprising:
  retrieving from the repository of rules a re-accommodation automation rule to check the overall automatic mapping between the cabin and travel class structures of the airline disrupted flight and of the one or more replacement flights;
  upon checking failing,
    requiring a manual audit to correct the actions of the automatic mapping.

7. The method of claim 1 further including the steps of:
  retrieving from the repository of rules a re-accommodation automation rule to check the overall automatic mapping between the cabin and travel class structures of the airline disrupted flight and of the at least one replacement flight;
  upon checking failing,
    requiring a manual audit to correct the actions of the automatic mapping.

8. The method of claim 7, wherein the retrieving step includes checking that no disrupted passengers are adversely impacted by the automatic mapping.

9. The method of claim 1 wherein the step of validating the direct match ends the automatic mapping of the cabin and travel class structures upon no discrepancy being found.

10. The method of claim 2, comprising:
  retrieving from the repository of rules a re-accommodation automation rule to check the overall automatic mapping between the cabin and travel class structures of the airline disrupted flight and of the one or more replacement flights;
  upon checking failing,
    requiring a manual audit to correct the actions of the automatic mapping.

11. The method of claim 1, further comprising:
  retrieving from the repository of rules a re-accommodation automation rule to check the overall automatic mapping between the cabin and travel class structures of the airline disrupted flight and of the one or more replacement flights;
  upon checking failing,
    requiring a manual audit to correct the actions of the automatic mapping.

12. The method of claim 1, comprising:
  for each passenger impacted by a disruption, determining a base disrupted flight out of a plurality of flights subject to disruption; and
  defining the base disrupted flight as airline disrupted flight.

13. The method of claim 1, comprising:
  determining a cabin and travel class pair applying to a passenger of the airline disrupted flight;
  determining at least one replacement flight for the passenger; and
  determining a re-accommodation option for the passenger on the at least one replacement flight using the mapping.

14. An automatic passenger re-accommodation system including comprising:
  at least one programmed computer; and
  a class mapping module, wherein the at least one programmed computer performs:
    determining a disruption period;
    retrieving the cabin and travel class structure of the airline disrupted flight for the disruption period;
    retrieving cabin and travel class structure data of at least one replacement flight, said data comprising, for the disruption period, different cabin and travel class structures each applicable during a disruption sub-period within the disruption period;
    for each disruption sub-period,
      initializing the mapping by first establishing a direct match between the cabin and travel class structure of the disrupted flight and the cabin and class structures of the at least one replacement flights;
      validating the direct match against the cabin and travel class structures of the at least one replacement flight, the validating step including the further step of detecting discrepancies;
      retrieving from a repository of rules class matching tables (CMTs) that apply to the disrupted flight for the disruption period and specifying correspondences between the cabin and travel class structure of the airline disrupted flight and the cabin and the travel class structures of the at least one replacement flight;
      retrieving validity periods for the class matching tables in which several validity periods partly covers the disruption sub-period;
      splitting the disruption sub-period is further sub-periods each corresponding to one single validity period of the class matching tables;
      for each discrepancy:
        retrieving rules of the class matching table corresponding to the further sub-period;
        applying the retrieved rules and determining a rule-driven mapping cabin and travel class pair assigned to the at least one replacement flight for the further sub-period in lieu of the discrepancy;
      creating a mapping between the cabin and travel class structure of the airline disrupted flight and the cabin and class structure of the at least one replacement flight using the direct match each time no discrepancy is detected and the rule-driven mapping cabin and travel class structure each time a discrepancy is detected.

15. A non-transitory computer readable storage medium with a computer program stored thereon, comprising computer readable code means for causing at least one computer to operate the method of automatically mapping a cabin and travel class structure of an airline disrupted flight into the cabin and travel class structures of at least one replacement flight, the method comprising:
  determining a disruption period;
  retrieving the cabin and travel class structure of the airline disrupted flight for the disruption period;
  retrieving cabin and travel class structure data of at least one replacement flight, said data comprising, for the disruption period, different cabin and travel class structures each applicable during a disruption sub-period within the disruption period;
  for each disruption sub-period,
    initializing the mapping by first establishing a direct match between the cabin and travel class structure of the disrupted flight and the cabin and class structures of the at least one replacement flights;

validating the direct match against the cabin and travel class structures of the at least one replacement flight, the validating step including the further step of detecting discrepancies;

retrieving from a repository of rules class matching tables (CMTs) that apply to the disrupted flight for the disruption period and specifying correspondences between the cabin and travel class structure of the airline disrupted flight and the cabin and the travel class structures of the at least one replacement flight;

retrieving validity periods for the class matching tables in which several validity periods partly covers the disruption sub-period;

splitting the disruption sub-period is further sub-periods each corresponding to one single validity period of the class matching tables;

for each discrepancy:
retrieving rules of the class matching table corresponding to the further sub-period;
applying the retrieved rules and determining a rule-driven mapping cabin and travel class pair assigned to the at least one replacement flight for the further sub-period in lieu of the discrepancy;

creating a mapping between the cabin and travel class structure of the airline disrupted flight and the cabin and class structure of the at least one replacement flight using the direct match each time no discrepancy is detected and the rule-driven mapping cabin and travel class structure each time a discrepancy is detected.

* * * * *

UNITED STATES PATENT AND TRADEMARK OFFICE
CERTIFICATE OF CORRECTION

| | | |
|---|---|---|
| PATENT NO. | : 7,983,939 B2 | Page 1 of 1 |
| APPLICATION NO. | : 12/334104 | |
| DATED | : July 19, 2011 | |
| INVENTOR(S) | : Jean-Philippe Chevance et al. | |

It is certified that error appears in the above-identified patent and that said Letters Patent is hereby corrected as shown below:

In the Claims:

Column 10, Claim 1, line 39, change "is" to --into--
Column 11, Claim 14, line 63, before "comprising" delete "including"
Column 12, Claim 14, line 28, change "is" to --into--
Column 13, Claim 15, line 14, change "is" to --into--

Signed and Sealed this
Fourteenth Day of January, 2014

Michelle K. Lee
*Deputy Director of the United States Patent and Trademark Office*